Patented Mar. 27, 1945

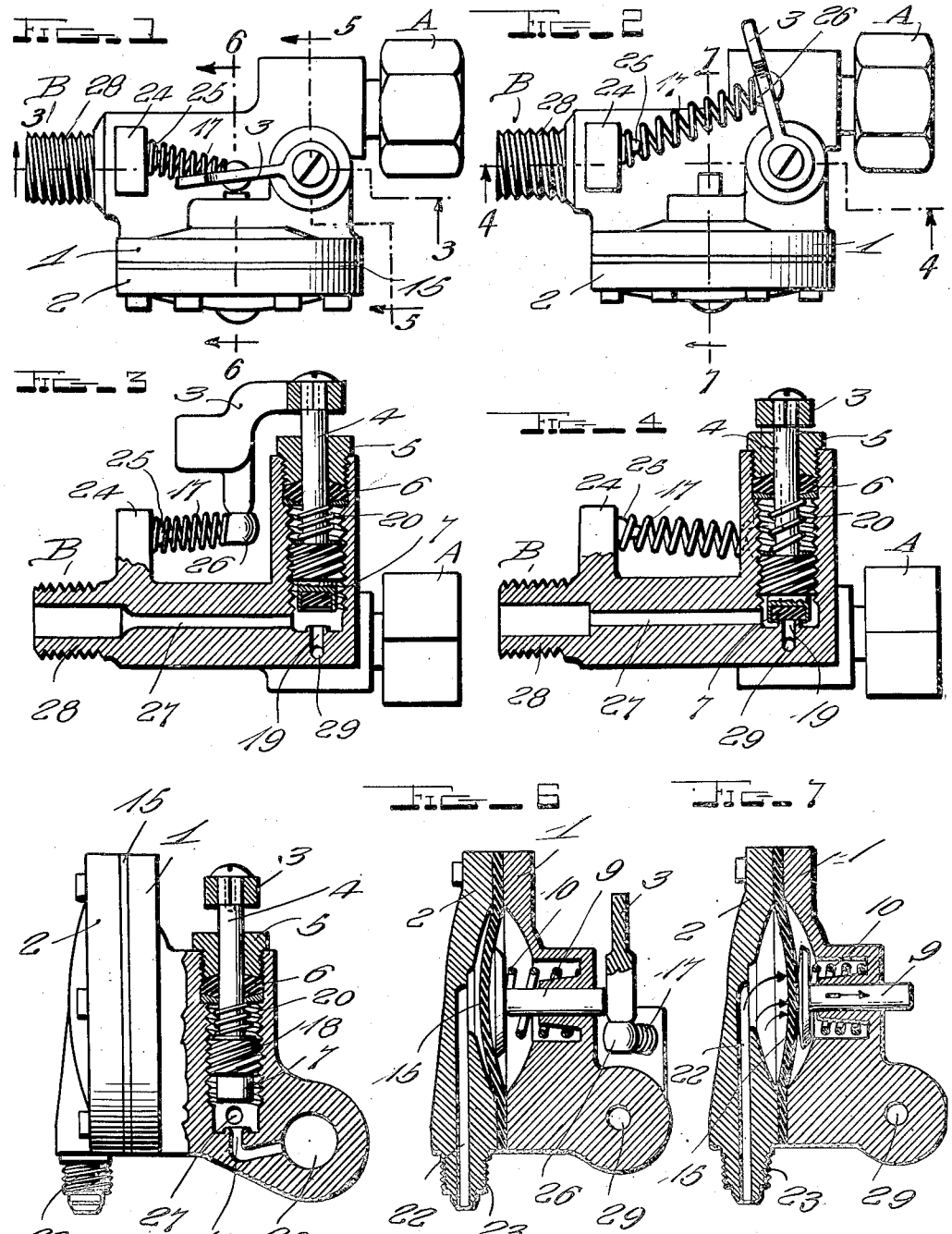

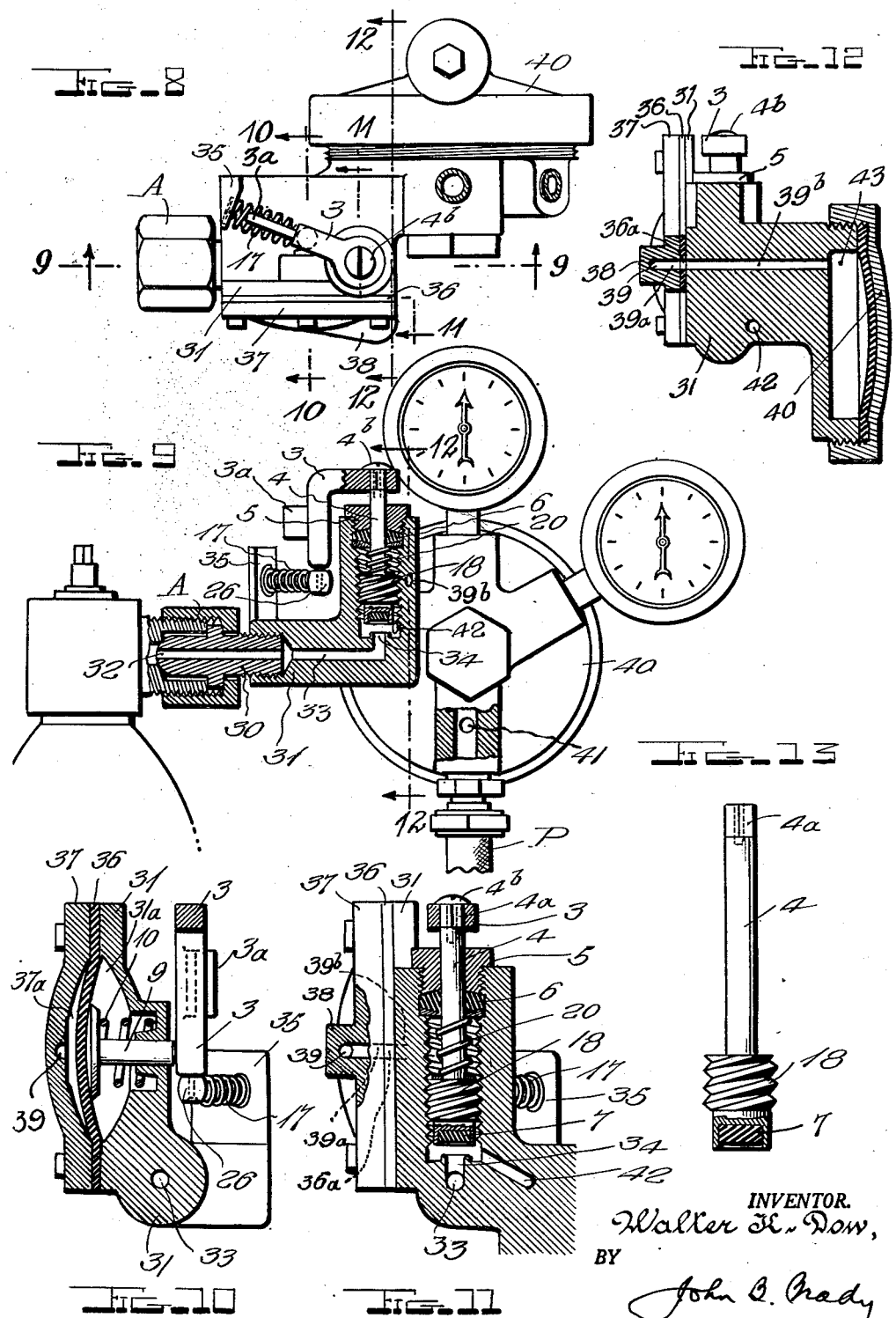

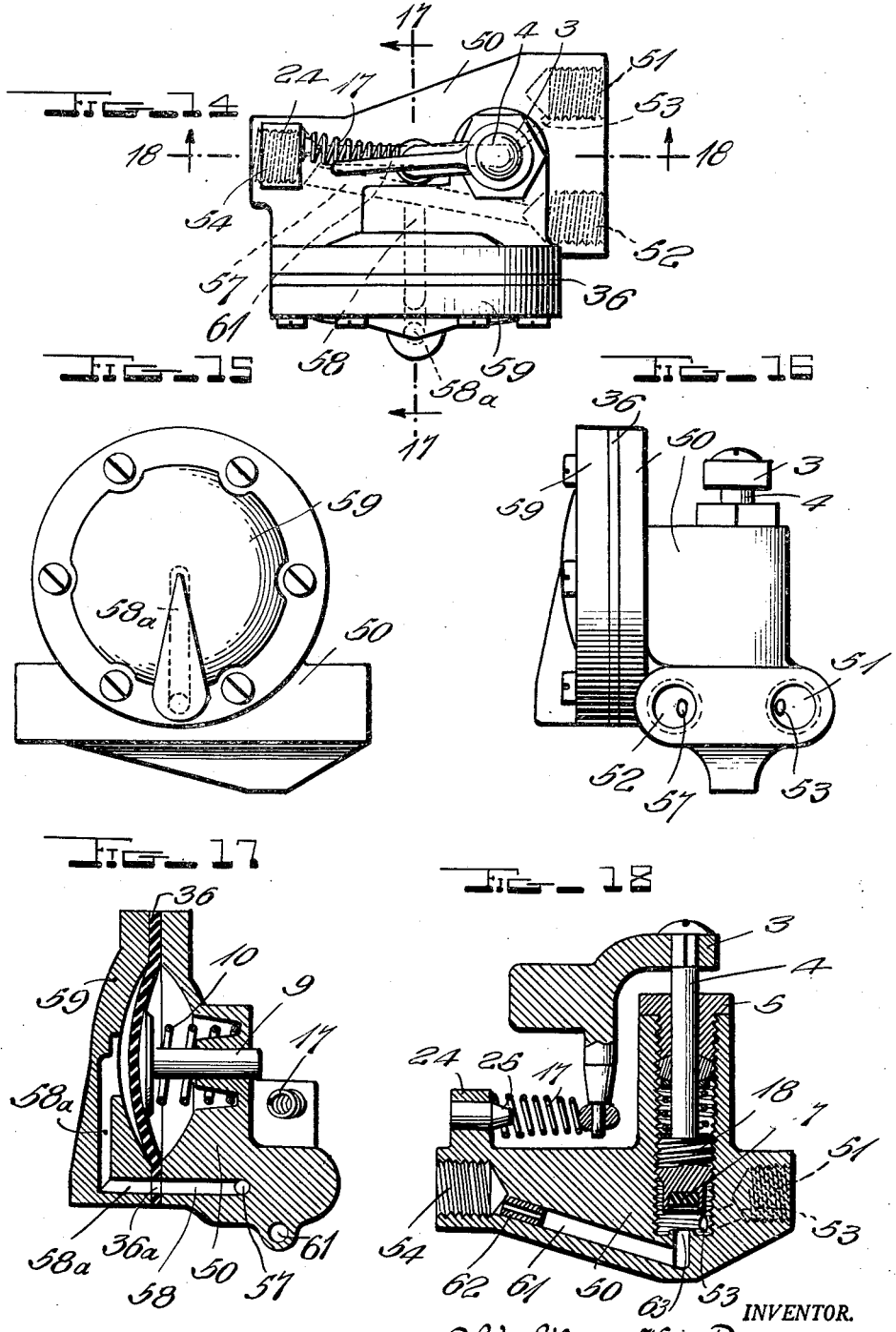

2,372,190

UNITED STATES PATENT OFFICE 2,372,190

SAFETY SHUTOFF VALVE AND SYSTEM

Walter K. Dow, Baltimore, Md.

Application September 13, 1940, Serial No. 356,693

8 Claims. (Cl. 50—5)

My invention relates broadly to improvements in gas and oxygen pressure reduction and more particularly to a safety shut-off valve in the inlet side of a regulator.

One of the objects of my invention is to provide an attachment which can be readily installed between an acetylene, hydrogen, oxygen or other gas high pressure cylinder container, and the delivery regulator, which will shut off the inlet gas to the regulator when the delivery pressure from the regulator exceeds a predetermined pressure setting of the attachment.

Another object of my invention is to provide a regulator having an integrally related shut-off valve associated therewith, which will shut off the inlet gas to the regulator when the delivery pressure from the regulator exceeds a predetermined pressure setting of the shut-off valve.

A further object of my invention is to provide a regulator or reducing valve having an integrally related inlet pressure shut-off valve, operative by the delivery pressure, which valve requires manual resetting or opening before the regulator can again deliver gas.

A still further object of my invention is to provide an attachment for a regulator or reducing valve having a shut-off valve therein, operative by the delivery pressure, which valve requires manual resetting or opening before the regulator can again deliver gas.

Still another object of my invention is to provide a device for protecting a gas regulator against injurious and excessive pressures by interposing in the gas line a quick action valve which is tripped under conditions of excessive pressure for instantaneously closing the gas line.

A further object of my invention is to provide a device for protecting gas regulators against excessive pressure which consists in interposing in the gas line a valve adapted to be rotatably advanced against a valve seat under spring snap action under conditions of excessive rise in pressure of the gas.

A still further object of my invention is to provide an inlet pressure shut-off valve for a gas regulator which will shut off the inlet gas when the regulator valve leaks beyond a predetermined pressure due to foreign particles depositing on the seat causing slight creep upwards of gas pressure.

Another object of my invention is to provide a shut-off valve for regulators which will shut off inlet pressure to the regulator in case of regulator valve seat failure.

Still another object of my invention is to provide a shut-off valve for a regulator which will shut off the inlet gas from the cylinder in case of diaphragm failure or breakage where delivery pressure surges upwards.

A further object of my invention is to provide a safety shut-off valve for the inlet side of commercial regulators that will shut off in case of diaphragm or seat failure and necessitate the deliberate manual opening or resetting of the safety shut-off valve by the operator before the regulator will again function.

A still further object of my invention is to provide a shut-off valve for the inlet side of a regulator that will shut off the inlet gas at a predetermined pressure setting to protect the delivery pressure gauge in cases of increased delivery pressure due to regulator seat leakage, diaphragm failure, or inexperienced or careless manipulation of the regulator adjustment means.

Other and further objects of my invention will be understood from the specification hereinafter following by reference to the accompanying drawings, in which:

Fig. 1 is a top plan view of the safety valve of my invention with the valve in position for feeding gas; Fig. 2 shows the valve shifted to shut-off position for closing the gas line; Fig. 3 is a view of the safety shut-off valve with parts partially in side elevation and partially in cross section on line 3—3 of Fig. 1 illustrating the interior arrangement of the safety shut-off valve with the valve in a position for feeding gas; Fig. 4 is a view similar to the view illustrated in Fig. 3 but showing the safety valve shifted to shut-off position, the view being taken substantially on line 4—4 of Fig. 2; Fig. 5 is an end view of the safety shut-off valve partially broken away and shown in section on line 5—5 of Fig. 1 showing the safety valve in open position; Fig. 6 is a cross sectional view through the diaphragm cylinder of the safety attachment taken on line 6—6 of Fig. 1 with the valve actuator in position ready to close the safety valve under conditions of excessive rise in pressure; Fig. 7 is a view similar to the view shown in Fig. 6 but illustrating the diaphragm cylinder actuated by excessive increase in gas pressure for moving the valve actuator of the safety valve; Fig. 8 is a top plan view of a regulator having a safety shut-off valve according to my invention constructed as an integral part of the regulator; Fig. 9 is an elevational view showing the assembly of the composite safety shut-off valve and regulator constructed in accordance with my invention with certain of the parts broken away and illustrated in cross section substantially on line 9—9 of Fig. 8; Fig. 10 is a cross sectional view through the diaphragm cylinder of the composite regulator and safety shut-off valve taken substantially on line 10—10 of Fig. 8; Fig. 11 is an end view of the diaphragm cylinder with the safety valve mechanism illustrated in cross section substantially on line 11—11 of Fig. 8; Fig. 12 is a cross sectional view through the composite regulator and safety shut-off valve on line 12—12 of Fig. 8 and Fig. 9 illustrating the pressure passage interconnecting the diaphragm cylinder of the regulator with the diaphragm cylinder of the safety shut-off valve; Fig. 13 is an enlarged view of the safety valve and actuator which is adapted for quick advance or retraction by multiple parallel thread interengagement between the valve housing and the valve carrier; Fig. 14 is a plan view of a further modified form of safety shut-off valve embodying my invention used as a combined shut-off valve and gas mixer or injector; Fig. 15 is a front view of the valve shown in Fig. 14; Fig. 16 is an end view of the valve shown in Fig. 14; Fig. 17 is a transverse sectional view taken on line 17—17 of Fig. 14; and Fig. 18 is a vertical sectional view taken on line 18—18 of Fig. 20.

The necessity for a regulator safety shut-off device will be appreciated when it is considered that all commercial oxygen, acetylene, hydrogen and other gas regulators must rely upon a valve seat for regulator operation. This seat is not only subject to wear because of its constant operation during gas delivery but is also subject to impairment by minute impurities and particles in the gas which deposit on the seat causing a slight leak. Lengthy steps are taken in the manufacture of regulators to prevent dirt entering during the assembly process and intricate complicated filters are often provided in the regulator design in order to prolong the successful operation of the regulator.

In spite of all the precautions taken, some ninety percent of the regulator failure is caused by valve seat leakage and endless operating trouble in oxy-acetylene welding and cutting is encountered along with the danger involved when rapid leakage causes pressure to increase beyond the safety point of hose or associated mechanism.

The operating life of a regulator or regulator seat can not be determined by its relative newness as it is not unusual for a regulator to allow the pressure to creep in its first hour of operation or immediately upon the replacement of a seat. I have seen approved regulators passed by qualified and experienced inspectors of the United States Navy Department leak within thirty minutes after approval and acceptance and through no fault of the original inspection.

Oxygen in contact with brass, of which most regulators are made, causes a bluish green powder to form within the regulator and almost on the valve seat. This powder eventually flakes off and deposits on the valve seat and causes leakage.

The valve opening between valve and seat in the commercial regulator for oxy-actylene is seldom over five thousandths of an inch and consequently particles lodge on the valve seat instead of passing through the valve.

The construction of commercial regulators (except those covered by my Patent #2,195,242, granted March 26, 1940) is such that upon diaphragm failure or breakage, the operating spring causes the valve to open wide and the sudden surge of high pressure not only ruins the delivery gauge but often causes serious damage by explosion.

It is obvious that where oxy-acetylene or other gas welding or cutting outfits are used or kept in enclosed rooms, buildings, ships, submarines, etc., the danger of a leaky regulator may cause serious damage to both life and property and it is for this reason that my invention provides a separate valve either in the regulator or as an attachment to commercial regulators of various makes, that will shut off the inlet gas to the regulator when the delivery pressure increases beyond a predetermined pressure setting.

I have been able to accurately demonstrate the fact that when a welding or cutting torch back fires, the valve of my invention will operate instantly and shut off the inlet gas to the regulator. The pressure created by combustion of the gas causes the valve to close. This is a most important property for securing quick operation of the protective system.

Referring to the drawings in more detail, I have shown a preferred type of valve construction for the commercial attachment although I do not intend that my construction shall be limited to the design shown. I am aware that there are other ways that the objects and results of my invention can be accomplished by different valve constructions and I intend to include such modifications within the scope of this invention.

Referring to the drawings in detail the valve comprises a body casting 1 and a body cap 2 hermetically interconnected as shown to provide a chamber in which diaphragm 15 operates. The body casting 1 is recessed to provide a chamber for receiving the spring pressed operating pin 9 having a mushroom type head thereon establishing contact with the resilient diaphragm 15. The coacting body cap 2 is likewise recessed to permit displacement of the diaphragm 15. The body cap 2 is provided with a port 22 which extends through the screw threaded terminus 23 to which connection is made to a tube which connects to the outlet fitting of the regulator. Thus pressure from a hose line or the outlet side of the regulator is effective directly against diaphragm 15. The body casting 1 provides a mounting means for the safety shut-off valve controlled through operating lever 3. The body casting 1 has a lateral projection 24 thereon which is provided with a lug 25 over which spring 17 fits in order to be continuously effective against the end portion 26 of the operating lever 3. The body casting 1 is provided with an internal passage 27 extending from the screw threaded end portion 28 forming part of the outlet coupling means B to the passage 19 against which the valve seat 7 is effective in performing the shut off function of the valve. The passage 19 connects to the intake passage 29 which leads to the coupling means A by which connection is made to the pressure tank.

When pressure on the front of a resilient diaphragm 15 builds up sufficiently to depress spring 10, operating pin 9 advances forcing operating lever 3 outward from the casting 1, as indicated in section in Fig. 7. Spring 17 by toggle action, then forces operating lever 3 around until valve stem 4 advances valve seat 7 to close the passage 19 from the tank to the regulator as shown in Figs. 1-4.

The valve stem thread 18 shown in Figs. 3, 4 and 5 is a multiple thread to provide a greater advance with less turning of operating lever 3. Seat 7 may be composition, hard rubber or metal and is replaceable as it is snapped into valve stem 4. Reference character 6 indicates a graphite and glycerine lubricated packing which is preloaded by spring 20 so that it is never necessary to tighten a packing nut. The packing 6 and valve seat 7 may be readily replaced by removing operating lever 3 and valve stem guide 5 which allows the whole valve stem assembly 4 to be removed.

The attachment is provided with the operating spring 10 shown in Figs. 6-7 having different tensions for different shut off pressures. An acetylene welding and cutting regulator has a normal maximum delivery pressure of from zero to twenty-five pounds and a normal thirty to fifty pound delivery gauge pressure. In this case the safety shut-off valve spring 10 would operate the valve at thirty pounds and when the regulator pressure exceeds that in the delivery chamber, gas would automatically be shut off on the inlet side of the regulator. Oxygen and other gas valves could likewise be set at whatever shut-off pressure is desired.

A valve of somewhat similar construction and exactly the same operation may be incorporated directly into the regulator body construction as shown in Figs. 8-13. The quick shut-off valve is housed within the same casting as that which houses the principal regulator. The operating parts are all substantially the same as explained in connection with Figs. 1-7. The coupling means A between the source of supply and the combined shut-off valve and regulator may assume various forms and in the instance shown the coupling means A establishes connection with member 30 which in turn establishes internal connection with body casting 31 of the combined shut-off valve and regulator system. Connecting member 30 has a passage 32 therethrough which aligns with passage 33 in the body casting 31.

The body casting 31, shown in Figs. 8-12, corresponds to the body casting 1 in the form of my invention shown in Figs. 1-7. A valve seat 34 is provided in the casting 31 similar to valve seat 19, shown in Figs. 3-5. The screw threaded portion of the body casting 31 is similar to the screw threaded portion of body casting 1, in that a multiple thread 18 is provided on valve stem 4 which extends through guide 5 and packing 6 for advancing valve 7 with respect to seat 34. The valve stem 4 is shaped at 4a to receive the operating lever 3 which is secured in position by screw 4b. Operating lever 3 is formed as described in connection with Figs. 1-7, into a right angular bend terminating in an end portion 26 constituted by a pivotally mounted bead journaled on the end of operating lever 3. A manual reset member is provided on operating lever 3 as indicated at 3a. The spring 17 which actuates the operating lever 3, is disposed between abutment 35 and end member 26. Both the abutment 35 and end member 26 have portions extending into the convolutions of coil spring 17. In addition, end member 26 is rockable with respect to operating lever 3. Accordingly, coil spring 17 is properly retained whether in contracted or expanded position. Only slight angular movement of operating lever 3 is required to effect a closing of valve 7 with respect to valve seat 34 by reason of the multiple thread 18. Leakage due to wear of the packing 6 is substantially prevented by continuous operation of spring 20.

The body casting 31 provides an annular support for resilient diaphragm 36, corresponding to diaphragm 15 in the form of my invention shown in Figs. 1-7. The body cap 37 is peripherally connected with body casting 31, in a manner similar to the connection of body cap 2 with body casting 1 in the form of my invention illustrated in Figs. 1-7. A chamber, provided on each side of diaphragm 36, is indicated at 31a and 37a whereby diaphragm 36 may function the operating pin 9 through the mushroom type head thereon against the action of spring 10 for shifting operating lever 3, for effecting a closing operation of valve 7. Chamber 37a has a central connection through passage 39. Passage 39 extends through the enlarged portion 38 of the wall of body cap 37, as shown in Fig. 12, and terminates in an opening 39a which registers with an opening 36a through diaphragm 36 which, in turn, registers with passage 39b which extends through the body casting 31, as shown in Figs. 9, 11 and 12. Passage 39b is formed in the casting which forms the housing for the main regulator 40. The passage 39 extends to the delivery or low pressure chamber of the regulator indicated at 43 through passages 39a, 36a and 39b. Passage 41 connecting to the outlet pressure pipe P also extends through the body casting and opens into the delivery or low pressure chamber of the regulator. Passage 41 makes a right angle turn through the body casting shown in Fig. 9. Thus, any back pressure in the hose due to back fire or accidental increase in pressure, is immediately effective against diaphragm 26 through passages 41 and 39b, and aperture 36a, and passage 39 to the entrance of chamber 37a, for functioning diaphragm 36 and shifting the position of pin 9 against action of spring 10, and moving operating lever 3 to a position in which spring 17 becomes effective against end member 26, thus imparting quick movement to valve stem 4 for closing valve 7 with respect to seat 34 and cutting off the supply of pressure through passage 42 to the high pressure chamber of the regulator 40. While regulator 40 functions continuously under normal conditions by the supply of pressure from the tank through passage 33, seat 34 and passage 42 to the high pressure chamber of the regulator, abnormal conditions in the pressure supply line, due to explosion or accident, are prevented from injuring regulator 40 because the abnormal pressure is effective through passages 41 and 39b and aperture 36a, passage 39a and entrance 39 to chamber 37a, to shift diaphragm 36 and move operating pin 9. The action, as heretofore explained, takes place very rapidly for as soon as operating lever 3 is moved over its dead center, coil spring 17 becomes effective for imparting quick movement to operating lever 3. Operating lever 3 rotates stem 4, the multiple screw 18 of which advances valve 7 into quick sealing engagement with valve seat 34, thus cutting off further supply of pressure from the tank to the regulator 40. Thus, excessive pressure which may occur, for example as a result of explosion of the gas, prevents destruction of the regulator and gauges connected therewith.

In the attachment shown in Figs. 1-7, coupling A may be constituted by a female thread, while coupling B is constituted by a male thread facilitating the coupling of the attachment into the line between the tank and the regulator.

My invention has various applications other than the safety shut-off valve application illustrated in Figs. 1-7 and the combined regulator and safety shut-off valve illustrated in Figs. 8-13. I have shown in Figs. 14-18 a combination safety shut-off valve and gas mixture or injector which may be successfully utilized in an oxygen acetylene gas distribution system for torches whereby the present cumbersome two-hose torch connections may be eliminated. The single hose which may be employed for a torch when using the safety shut-off valve of my invention is lighter and more handy for the operative and offers less impedance to the work of welding. The single hose torch requires but one manual control valve to control the size of the neutral flame and need not be equipped with an injector or gas mixer as gas and oxygen come to the torch already mixed. The safety shut-off valve may be installed either between regulators and supply tanks or between Y fitting mixer and regulators. In case of torch backfire the inlet gas supply would be immediately shut off by the closing of the shut-off valve, when pressure in hose increased due to explosion of the gas in the hose.

My shut-off valve may also be an integral part of the gas mixer or injector Y fitting as shown in Figs. 14-18, and in this case gas and oxygen could be taken from standard regulators by a short piece of hose, mixed in the combination mixer and shut-off valve and then taken as mixed gas to the torch through one hose. In case of torch backfire the shut-off valve shuts off the inlet gas at the mixer. Oxygen may also be shut off at the mixer if desired.

By protection from backfire I mean that when through error in connections of hose or through a damaged injector in the torch or for any number of other reasons oxygen accumulates in the acetylene hose causing an explosion therein, the device will shut off the inlet acetylene and of course eliminate any further danger by fire or explosion. It is also possible under certain conditions for the device to operate from the minor explosion occurring ahead of the injector or gas mixer such as occurs when shutting off the acetylene valve first on a lighted torch. (This is often referred to as a pop-out and it is not unusual for a torch to catch afire ahead of the injector, the resultant explosion not being great enough to operate the device except under certain conditions.)

In Fig. 14 I have indicated the body casting of the combination shut-off valve and gas mixer by reference character 50 containing threaded hose connection 51 serving as an inlet connection for the acetylene and threaded inlet connection 52 for the oxygen supply. A passage 53 extends from the inlet connection 51 through the body structure 50 to the shut-off valve chamber. The shut-off valve structure is the same as that described in the arrangement shown in Figs. 1 to 7 and in the arrangement illustrated in Figs. 8-13 and includes an operating lever 3 controlling the valve stem assembly 4, operating the valve seat 7 through multiple thread member 18. Valve seat 7 coacts with the valve seat 63. The functioning of the valve is controlled by a spring 17 suitably secured over retaining member 25 supported on lug 24. The outlet hose connection is provided in the body structure 50 as indicated at 54 and permits a connection from the mixing unit through a single hose through which the mixed acetylene gas and oxygen are fed to a torch. The oxygen is conveyed from the oxygen inlet 52 through passage 57 in body structure 50 to the outlet mixed gas connection 54. The mixed gas connection communicates with the diaphragm chamber through passage 58. The passage 58 corresponds generally with the passage 39b in the form of my invention illustrated in Figs. 8-13 in that the passage registers with an aperture 36a in diaphragm 36 and a passage 58a in the head 59 of the diaphragm chamber. The valve operating parts include the resilient diaphragm 36, the mushroom headed operating pin 9 and spring 10. The communicating passage 58 connects the diaphragm chamber with the oxygen passage 57.

In Fig. 18 I have shown the passage 53 for the acetylene gas from the acetylene inlet 51 to the shut-off chamber and from the shut-off chamber to the mixed gas outlet through valve seat 63 and passage 61. Tubular member 62 represents an injector plug pressed into passage 61 and having a metered hole for controlling the necessary pressure setting of the acetylene regulator and the velocity of the acetylene as it mixes with the oxygen. In some applications it is also necessary to control the oxygen in this same manner and in these cases an oxygen injector plug will be pressed in passage 57 where it enters connection chamber 54. Operation of this unit is basically the same as the shut-off valve attachment.

Other arrangements of the safety shut-off valves with respect to the regulator and with respect to the hose-line leading to a torch may be employed. The single hose extending from a mixing Y or from the combined mixing and shut-off valve constitutes a very substantial advance in the welding art.

While I have described my invention in certain preferred embodiments, I realize that modifications may be made and I desire that it be understood that no limitations upon my invention are intended other than are imposed by the scope of the appended claims.

What I claim as new and desire to secure by Letters Patent of the United States is as follows:

1. A valve and regulator system comprising in combination with a regulator having a high pressure inlet chamber and a low pressure outlet chamber, a shut-off valve and coacting valve seat interposed in the inlet of said regulator, means for angularly moving said shut-off valve to advance or retract said shut-off valve with respect to said valve seat, a valve actuator for imparting movement to said means, a compression spring controlled by said valve actuator and operating to normally maintain said means in a position in which said valve permits the free passage of gas into said regulator through said valve seat, and means for operating said valve actuator for effecting an expansion of said compression spring under conditions of excessive increase in pressure in the outlet chamber of said regulator for moving said first mentioned means for closing said shut-off valve with respect to said valve seat.

2. A valve and regulator system comprising in combination with a regulator having a high pressure inlet chamber and a low pressure outlet chamber, a valve body including a shut-off valve and coacting valve seat interposed in the inlet of said regulator, an angularly movable valve actuator for advancing or retracting said shut-off valve with respect to said valve seat, a compression spring disposed between said valve body and said angularly movable valve actuator and aligned therewith for normally maintaining said shut-off valve in open position relative to said valve seat, and means controlled by the pressure in said outlet chamber for displacing said spring out of alignment with said angularly movable valve actuator under conditions of excessive increase in pressure in said outlet chamber for rendering said spring effective to angularly shift said angularly movable valve actuator for closing said shut-off valve with respect to said valve seat.

3. A valve and regulator system comprising in combination with a regulator having a high pressure inlet chamber and a low pressure outlet chamber, a valve body including a shut-off valve and coacting valve seat interposed in the inlet of the regulator, an angularly movable valve actuator for advancing or retracting said shut-off valve with respect to said valve seat, a compression spring disposed between said valve body and said angularly movable valve actuator and aligned therewith for normally maintaining said shut-off valve in open position relative to said valve seat and a diaphragm device subject to pressure of the outlet chamber of said regulator for displacing said spring out of alignment with said angularly movable valve actuator under conditions of excessive increase in pressure in said outlet chamber for rendering said spring effective to angularly shift said angularly movable valve actuator for closing said shut-off valve with respect to said valve seat.

4. A valve and regulator system comprising in combination with a regulator having a high pressure inlet chamber and a low pressure outlet chamber, a valve body including a shut-off valve and coacting valve seat interposed in the inlet of the regulator, an angularly movable valve actuator for advancing or retracting said shut-off valve with respect to said valve seat, a compression spring disposed between said valve body and said angularly movable valve actuator and aligned therewith for normally maintaining said shut-off valve in open position relative to said valve seat, a pin member disposed on an axis substantially normal to the axis of said spring and operative against said angularly movable valve actuator, and means controlled by the pressure in said outlet chamber for imparting movement to said pin member under conditions of excessive increase in pressure in the outlet chamber of said regulator for rendering said spring effective to angularly shift said angularly movable valve actuator for closing said shut-off valve with respect to said valve seat.

5. A valve and regulator system comprising in combination a regulator with a high pressure inlet passage and a low pressure outlet chamber, a valve body including a shut-off valve and coacting valve seat interposed in the inlet of said regulator, an angularly movable valve actuator for advancing or retracting said shut-off valve shiftable through a distance of approximately 90 degrees for closing or opening said shut off valve with respect to said valve seat, a compression spring disposed between said valve body and said angularly movable valve actuator and aligned therewith for normally maintaining said shut-off valve in open position relative to said valve seat, and means controlled by the pressure in said outlet chamber for displacing said spring out of alignment with said angularly movable valve actuator under conditions of excessive increase in pressure in said outlet chamber for rendering said spring effective to angularly shift said angularly movable valve actuator for closing said shut-off valve with respect to said valve seat.

6. A combined safety shut-off valve and mixer comprising a body structure, inlet connections for independent sources of gas under pressure at one end of said body structure, a common delivery connection at the other end of said body structure providing a passage for normally effecting mixing of the gases, independent passages between said inlet connections and said common delivery connection, a spring actuated valve interposed in one of said passages, and a pressure actuated diaphragm subject to the pressure in the other of said passages and operative upon excessive rise thereof for operating said spring actuated valve for shutting off the passage of gas through said one passage.

7. A safety gas valve comprising a body structure having a gas passage therein, valve means in said gas passage including a movable valve member, lever actuating means for said valve member, spring means mounted between said body structure and said lever actuating means for said valve member; said lever actuating means being pivotally mounted on an axis normal to the direction of action of said spring means, said spring means being disposed to operate in a direction to one side or another of said axis dependent upon the position of said lever actuating means, said lever actuating means being manually operable to a position maintained by action of said spring means in a direction to one side of said axis, for operating said valve means to open said gas passage, and means automatically operable in accordance with predetermined safety factor to displace said lever actuating means to a position wherein said spring means acts in a direction to the other side of said axis and effects instantaneous operation of said valve means to close said gas passage.

8. A safety gas valve as set forth in claim 7 wherein said automatically operable means includes a pressure actuated device.

WALTER K. DOW.